April 20, 1965  W. K. WASDELL  3,179,122
BI-DIRECTIONAL FLOW VALVE
Filed Feb. 26, 1962
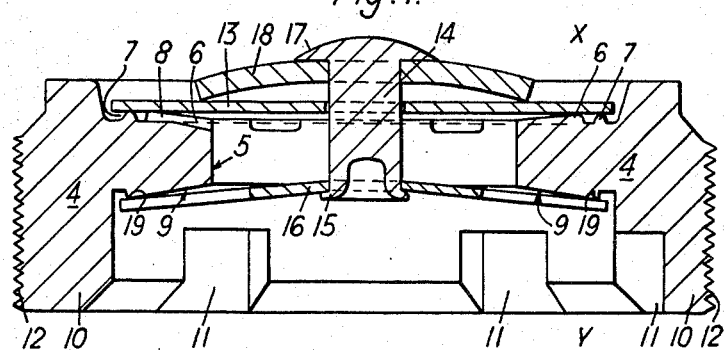
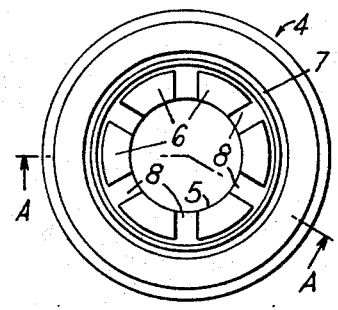
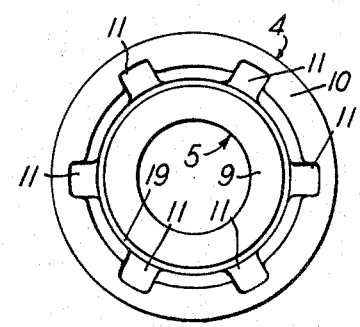
Inventor
WILLIAM KENNETH WASDELL
By Norris & Bateman
Attorneys

United States Patent Office 3,179,122
Patented Apr. 20, 1965

3,179,122
BI-DIRECTIONAL FLOW VALVE
William Kenneth Wasdell, Highbury, Barker Road,
Sutton Coldfield, England
Filed Feb. 26, 1962, Ser. No. 175,626
Claims priority, application Great Britain, Mar. 3, 1961,
8,966/61
2 Claims. (Cl. 137—493)

This invention relates to valves and more particularly, though not exclusively, to valves incorporated in fluid controlled shock absorbers for motor vehicle suspensions.

The invention has for its principal object a valve for affording a substantially unrestricted flow of fluid in one direction and to afford a restricted fluid flow in the opposite direction dependent upon the pressure obtaining in the fluid.

A more specific object of the invention is a valve of low inertia suited for use in a single wall vehicle suspension shock absorber for controlling the flow of damping medium between the working chamber containing the piston and the recuperation chamber containing the piston rod displacement compensating sack or bellows, such a valve being commonly known and hereinafter referred to as the foot valve of the shock absorber. One example of the type of shock absorber to which the valve is applicable is described in British patent specification No. 825,778.

The invention consists of a fluid control valve comprising a body provided with at least one port therethrough, on a face of said body at least one continuous valve land and at least one support land, one land surrounding the other, and a resilient valve disc resting on at least one of the said lands and adapted to bow on the support land when subjected to fluid pressure to permit fluid flow through a gap established by said bowing between said element and valve land and thence through said port.

One example of the practical application of the invention is described with reference to the accompanying drawings wherein:

FIG. 1 shows in cross-section a shock absorber foot valve embodying the invention and FIGS. 2 and 3 are plan and inverted plan views respectively of the body of the valve shown in FIG. 1, but on a reduced scale.

In FIG. 2 the line of section of FIG. 1 is designated A—A.

The valve illustrated in the drawings comprises a valve body 4, conveniently composed of sintered iron, having a central bore 5 therethrough surrounded on one face of the body by an inner land 6, herein called the support land and an outer land 7, herein called the valve land. The valve land 7 takes the form of a continuous circular rib integral with the body 4 and concentric with the bore 5. The support land is also integral with the body 4 and concentric with the bore 5 and is raised at its outer edge to the same height as that of the valve land whereas its face which is of frusto-conical shape terminates at the rim of the bore 5 at a lesser height than the valve land. Unlike the valve land the support land is not continuous but is interrupted by a plurality of radially extending channel like ports 8. The opposite face 9 of the valve body to that incorporating the lands is of frusto-conical form increasing in thickness from the rim of the bore 5 towards an axially extending cylindrical wall 10 incorporating a plurality of spanner slots 11. The periphery of the valve body is screw threaded at 12 to permit the mounting of the valve body within a screw tapped part of the interior of the cylinder of the shock absorber.

The valve further comprises a resilient flat valve disc 13, preferably composed of spring steel, having a diameter extending over the valve land 7. The disc 13 has a central aperture 20 of sufficient size to freely pass the stem of a rivet 14. Also mounted on the stem of the rivet and retained by the deformed foot 15 of the rivet is a light spring steel spider 16 whose free ends rest on the shoulder 19 on the face 9. This spring spider 16 is pre-loaded in assembly to bias the valve disc 13 onto both the valve and support lands 7 and 6.

Preferably there is provided between the head 17 of the rivet and the valve disc 13 a substantially rigid plate 18 advantageously bowed as shown in FIG. 1. The plate 18 has a diameter somewhat greater than that of the diameter of the bore 5.

In operation of the valve, as the pressure of fluid increases on the side X of the valve, the valve disc 13 is pressed on to both the valve and support lands to prevent flow of fluid through the bore 5. As the fluid pressure increases the valve disc 13 is bowed on the supporting land 6 so as to create a gap between the valve land 7 and the underside of the marginal part of the disc 13 whereby the fluid is permitted to flow through the ports 8 and thence through the bore 5 to the opposite side Y of the valve. With further increase in pressure the aforesaid gap is progressively enlarged to permit increased flow of fluid.

Whilst the presence of the plate 18 is not essential it serves to prevent secondary bowing of the valve disc about the rim of the bore 5 which is found in practice to lead to early failure of the disc 13. Instead of using the plate 18 the valve disc 13 may itself be strengthened in its central region so as to restrict its bowing to its outer region.

Upon relaxation of the fluid pressure the valve disc 13 returns to its normal flat condition so progressively closing the gap between the valve land 7 and the disc and progressively cutting off the fluid flow.

With the fluid pressure higher on the side Y than the side X of the valve the relatively light spring spider 16 permits the valve disc 13 to move bodily axially to allow a substantially unrestricted flow of fluid back through the valve.

It is to be realised that it is not essential that the tops of the valve and support lands be co-planar since their relative heights may be designed to impart different flow control characteristics into the valve. For example if the supporting land 6 is of lesser height than the valve land then the valve disc will only begin to open after the fluid pressure has increased to an extent wherein the bowing of the valve disc is sufficient to bring the valve disc into contact with the supporting land, whereafter further bowing of the valve disc begins to create the gap between its underside and the valve land. Thus the valve acts as a pre-loaded valve.

Alternatively the valve land may be of slightly less height than the supporting land to permit a bleed flow of fluid before the fluid pressure acts to bow the disc and open the valve.

It is further to be realised that it is not essential that the support land be interrupted to permit flow through the bore encircled by the support lands. Instead the support land may be continuous with ports through the valve body disposed between the valve and support lands.

I claim:

1. A fluid control valve comprising a body having a through bore, radially spaced annular lands on one side of said body coaxially surrounding and adjacent one end of said bore, the outermost land being a continuous valve land and the innermost land being a substantially frusto-conical support land of less height toward said one end of said bore having a plurality of radial passages therethrough that are in fluid communication at opposite ends with the bore and the space between said lands, a resilient substantially flat valve element extending over said one end of the bore and both of said lands, a spring spider peripherally engaging the other side of the body at the other end of said bore, and a stem on which said spider is centrally supported extending through said bore and operatively connected to the central portion of said valve element, means in said connection between the stem and said valve element for preventing bowing of said element about the rim of said one end of the bore, said spring spider biasing said valve element into contact with both of said lands and thereby normally closing the valve against transmitting fluid pressure through said bore, and excess fluid pressure acting upon the side of said valve at said one end of the bore causing the outer periphery of said valve element to flex about said support land to become displaced from said valve land and thereby communicate said pressure through said passages to said bore.

2. A fluid control valve comprising a body having a through bore, radially spaced annular lands on one side of said body coaxially surrounding and adjacent one end of said bore, the outermost land being a continuous valve land and the innermost land being a substantially frusto-conical support land of less height toward said one end of the bore having a plurality of radial passages therethrough that are in fluid communication at opposite ends with the bore and the space between said lands, a resilient substantially flat valve element extending over said one end of the bore and both of said lands, said element having a central aperture, a spring spider peripherally engaging the other side of the body at the other end of said bore, a stem on which said spider is centrally supported extending through said bore and freely through said aperture, a relatively rigid bowed plate mounted on the end of said stem projecting through said valve element and of such size as to peripherally engage said valve element outwardly of the bore diameter, said spring spider normally biasing said valve element into contact with both of said lands and thereby normally closing the valve against transmitting fluid pressure through said bore, and excess fluid pressure acting upon the side of said valve at said one end of the bore causing the outer periphery of said valve element to flex about said support land to become displaced from said valve land and thereby communicate said pressure through said passages to said bore.

References Cited by the Examiner

UNITED STATES PATENTS

| 2,177,779 | 10/39 | McDonald | 137—454.5 |
| 2,596,982 | 5/52 | Chisholm | 137—493.5 |
| 2,691,387 | 10/54 | Strauss | 137—541 |
| 3,044,762 | 7/62 | Stengelin | 137—541 XR |

FOREIGN PATENTS

| 653,583 | 5/51 | Great Britain. |

M. CARY NELSON, *Primary Examiner.*

MARTIN P. SCHWADRON, *Examiner.*